US007849195B2

(12) United States Patent
Jokela et al.

(10) Patent No.: US 7,849,195 B2
(45) Date of Patent: Dec. 7, 2010

(54) HOST IDENTITY PROTOCOL METHOD AND APPARATUS

(75) Inventors: Petri Aulis Jokela, Espoo (FI); Jan Mikael Melen, Espoo (FI); Raimo Vuopionperä, Espoo (FI); Sèbastien Pierrel, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 461 days.

(21) Appl. No.: 11/915,196

(22) PCT Filed: May 23, 2006

(86) PCT No.: PCT/EP2006/062549

§ 371 (c)(1),
(2), (4) Date: Jan. 9, 2008

(87) PCT Pub. No.: WO2006/125787

PCT Pub. Date: Nov. 30, 2006

(65) Prior Publication Data

US 2008/0195737 A1 Aug. 14, 2008

(30) Foreign Application Priority Data

May 27, 2005 (GB) .................. 0510761.0

(51) Int. Cl.
*G06F 15/16* (2006.01)

(52) U.S. Cl. ..................................... 709/227; 709/200

(58) Field of Classification Search ......... 709/200–203, 709/217–227, 228
See application file for complete search history.

(56) References Cited

U.S. PATENT DOCUMENTS 6,519,232 B1 * 2/2003 Becher ....................... 370/314
2007/0204150 A1 * 8/2007 Jokela et al. ................ 713/161
2007/0274312 A1 * 11/2007 Salmela et al. .............. 370/392

* cited by examiner

Primary Examiner—Moustafa M Meky

(57) ABSTRACT

A method of establishing a connection between a second host and an application socket on a first host. The method utilizes the Host Identity Protocol (HIP). The method includes the steps of establishing either a new or a selected existing HIP Security Association between the first and second hosts; creating a new or selecting an existing Tube Association between the application socket and the Security Association; and forming an association for the connection between the application socket, the Security Association, and the Tube Association. This establishes a connection between the second host and the application socket on the first host through the Security Association and the Tube Association.

28 Claims, 8 Drawing Sheets

Logical new packet structure

Actual packet structure after the HIP negotiation

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|           Port(src)           |           Port(dst)           |
+-+-+-+-+-+-+-+-+-+-+-+-+-+-+-+-+-+-+-+-+-+-+-+-+-+-+-+-+-+-+-+-+
| Proto number  |            Padding                            |
+-+-+-+-+-+-+-+-+-+-+-+-+-+-+-+-+-+-+-+-+-+-+-+-+-+-+-+-+-+-+-+-+
|           Port(src)           |           Port(dst)           |
+-+-+-+-+-+-+-+-+-+-+-+-+-+-+-+-+-+-+-+-+-+-+-+-+-+-+-+-+-+-+-+-+
| Proto number  |            Padding                            |
+-+-+-+-+-+-+-+-+-+-+-+-+-+-+-+-+-+-+-+-+-+-+-+-+-+-+-+-+-+-+-+-+
|                            TubeID                             |
+-+-+-+-+-+-+-+-+-+-+-+-+-+-+-+-+-+-+-+-+-+-+-+-+-+-+-+-+-+-+-+-+
```

Type          X
Length        variable
Port(src)     Local port number
Port(dst)     Peer port number
Proto number  Protocol number (e.g. TCP, UDP)
TubeID        TubeID values for this set of ports, most preferred
              First

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|            TubeID             |            TubeID             |
+-+-+-+-+-+-+-+-+-+-+-+-+-+-+-+-+-+-+-+-+-+-+-+-+-+-+-+-+-+-+-+-+
|            TubeID             |   . . . . . . . . .           |
+-+-+-+-+-+-+-+-+-+-+-+-+-+-+-+-+-+-+-+-+-+-+-+-+-+-+-+-+-+-+-+-+
|                              SPI                              |
+-+-+-+-+-+-+-+-+-+-+-+-+-+-+-+-+-+-+-+-+-+-+-+-+-+-+-+-+-+-+-+-+
|                              SPI                              |
```

Type       X
Length     variable
TubeID     TubeIDs to be connected to an SPI pair
SPI        Sender side SPI values, most preferred first

HOST IDENTITY PROTOCOL METHOD AND APPARATUS

BACKGROUND OF THE INVENTION

1. Field of the Invention

The present invention relates to a Host Identity Protocol Method and Apparatus.

2. Description of the Related Art

When the Internet was originally devised, hosts were fixed in location and there was implicit trust between users despite the lack of real security or host identification protocols, and this situation continued even upon wider uptake and use of the technology. There was little need to consider techniques for dealing with host mobility since computers were relatively bulky and immobile.

With the revolution in telecommunications and computer industry in the early 1990's, smaller communication equipment and computers became more widely available and the invention of the World Wide Web, and all the services that emerged with it, finally made the Internet attractive for the average person. The combination of increasing usage of the network and mobile telecommunications created the need for secure mobility management in the Internet.

The increasing number of involved parties, and the monetary transactions that were needed for certain services, also created a need for added application level security. Currently, the most widely used encryption protocols, for example SSL/TLS, are running within the upper network layers, for example TCP.

Taking into account the above mobility management and security issues, the Mobile IP standard (C. Perkins, "IP Mobility Support for IPv4", RFC 3220, IETF, 2002) and the Mobile IPv6 standard (D. Johnson, C. Perkins, J. Arkko, "Mobility Support in IPv6", RFC3775, IETF, 2004) have been introduced. Together these specifications are planned to provide mobility support for the next generation Internet. Security work is developing in the form of IPsec, and related activities, such as various key exchange protocols, with the aim being to provide security in the IP layer. However, experience has shown that it is fairly hard to reach combined security and mobility using the current standards.

An IP address describes a topological location of a node in the network. The IP address is used to route the packet from the source node to the destination. At the same time the IP address is also used to identify the node, providing two different functions in one entity. This is akin to a person responding with their home address when asked who they are. When mobility is also considered, the situation becomes even more complicated: since IP addresses act as host identifiers in this scheme, they must not be changed; however, since IP addresses also describe topological locations, they must necessarily change when a host changes its location in the network. Clearly, it is impossible to achieve both stability and dynamic changes at the same time.

In the case of Mobile IP, the solution is to use a fixed home location providing a "home address" for the node. The home address both identifies the node and provides a stable location for it when it is at home. The current location information is available in the form of a care-of address, which is used for routing purposes when the node is away from home.

Another solution to the problem is to separate the identification and location functions from each other, and this is the approach taken in the Host Identity Protocol (HIP) proposal (R. Moskowitz, P. Nikander, P. Jokela, "Host Identity Protocol", Internet Draft, work in progress, draft-ietf-hip-base-05, IETF, 2006). HIP separates the location and identity roles of IP addresses by introducing a new name-space, the Host Identity (HI). In HIP, the Host Identity is basically a public cryptographic key of a public-private key-pair, and is generated from and linked to the private key. The public key identifies the party that holds the only copy of the private key. A host possessing the private key of the key-pair can directly prove that it "owns" the public key that is used to identify it in the network. The separation also provides a means to handle mobility and multi-homing in a secure way.

HIP is discussed in more detail below, but is not the only proposal based around the idea of location and identity separation. FARA (D. Clark, R. Braden, A. Falk, V. Pingali, "FARA: Reorganizing the Addressing Architecture", ACM SIGCOMM 2003 Workshops, Aug. 25 & 27, 2003) is a generalized model of ideas that provides a framework from which the actual architecture can be derived. FARA could make use of the HIP when the node identifications are verified, and consequently HIP could be a part of a particular FARA instantiation. The PeerNet proposal (J. Eriksson, M. Faloutsos, S. Krishnamurthy, "PeerNet: Pushing Peer-to-Peer Down the Stack", IPTPS '03, Feb. 20-21, 2003) also discusses the location and identity separation. The Internet Indirection Infrastructure, $I^3$ (I. Stoica, et. al., "Internet Indirection Infrastructure", ACM SIGCOMM '02, Aug. 19-23, 2002) also defines a separation between the identity and routing information.

The Host Identity Protocol introduces a separation between the location and identity information at the IP layer. In addition to the separation, a protocol is defined to negotiate security associations (SAs) between HIP-enabled nodes.

With HIP, each host has one or more identities, which can be long-term or short-term, that can be used to identify it in the network. With HIP, an identifier is the public key of a public-private key pair. When the host possesses the private key, it can prove that it actually "owns" this identity that the public key represents; this is akin to showing an ID-card.

Each host can generate short-term keys to be used only for a short time. These are useful when it is not necessary for the node to be identified with the same identity later. For example, buying books from a bookstore may be a long-term relationship, while contacting a server once to collect user profiles may be considered to be a short-term action. In the latter case a short-term identity can be created to avoid more widespread dissemination of the long-term identity.

The HIP Host Identity (HI), being a public key, can be quite long and is therefore not practical in all situations. In HIP, the HI is represented with a 128-bit long Host Identity Tag (HIT) that is generated from the HI by hashing it. Thus, the HIT identifies a HI. Since the HIT is 128 bits long, it can be used for IPv6 applications directly as it is exactly the same length as IPv6 addresses.

Another representation of the Host Identities is the Local Scope Identifier (LSI), which is a 32-bit representation for the Host Identity. The purpose of the LSI is to facilitate using Host Identities in existing protocols and APIs. For example, since the LSI is the same length as an IPv4 address, it can be used for IPv4 applications directly. Although much of the remainder of this description will be based around the use of the longer HIT, it will be appreciated that the same or similar considerations apply to the alternative LSI representation.

When HIP is used, the upper layers, including the applications, no longer see the IP address. Instead, they see the HIT as the "address" of the destination host. The location information is hidden at a new layer, to be described below. The IP addresses no longer identify the nodes; they are only used for routing the packets in the network.

Applications are not typically interested in location information but do need to know the identity of their peers. The identity is represented by the HIT. This means that the IP address only has importance on lower layers where routing is concerned. The HITs, which the applications use, must be mapped to the corresponding IP addresses before any packets leave the host. This is achieved in a new Host Identity Layer as described below.

FIG. 1 of the accompanying drawings illustrates the various layers in HIP, comprising the standard transport layer 4, network layer 8 and link layer 10, with a process 2 communicating with the transport layer 4 below it. With HIP, a new Host Identity Layer 6 is disposed between the transport layer 4 and the network layer 8.

Locally, each HI and its associated HIT are mapped to the IP addresses of the node. When packets are leaving the host, the correct route is chosen (by whatever means) and corresponding IP addresses are put into the packet as the source and destination addresses. Each packet arriving from the upper layer contains the HIT of the peer as the destination address. The mapping between the HIT and the location information can be found at the HI layer 6. Hence, the destination address is converted to the mapped IP address, and the source HIT is converted to source IP address.

The mapping between a peer HIT and IP address can be retrieved in several ways, one of which being from a DNS server. The location information can be updated by the peer node any time. The update procedure will be discussed in more detail below.

HIP defines a base message exchange containing four messages, a four-way handshake, and this is used to create a security association (SA) between HIP-enabled hosts. During the message exchange, the Diffie-Hellman procedure is used to create a session key and to establish a pair of IPsec Encapsulating Security Payload (ESP) Security Associations (SAs) between the nodes.

FIG. 2 of the accompanying drawings illustrates the operation of the four-way handshake. The negotiating parties are referred to as the Initiator, starting the connection, and the Responder. The Initiator begins the negotiation by sending an I1 packet that contains the HITs of the nodes participating in the negotiation. The destination HIT may also be zeroed, if the Responder's HIT is not known by the Initiator.

When the Responder gets the I1 packet, it sends back an R1 packet that contains a puzzle to be solved by the Initiator. The protocol is designed so that the Initiator must do most of the calculation during the puzzle solving. This gives some protection against DoS attacks. The R1 initiates also the Diffie-Hellman procedure, containing the public key of the Responder together with the Diffie-Hellman parameters.

Once the R1 packet is received, the Initiator solves the puzzle and sends a response cookie in an I2 packet together with an IPsec SPI value and its encrypted public key to the Responder. The Responder verifies that the puzzle has been solved, authenticates the Initiator and creates the IPsec ESP SAs. The final R2 message contains the SPI value of the Responder.

The SAs between the hosts are bound to the Host Identities, represented by the HITs. However, the packets travelling in the network do not contain the actual HI information, but the arriving packet is identified and mapped to the correct SA using the Security Parameter Index (SPI) value in the IPsec header. FIG. 3 of the accompanying drawings shows the logical and actual packet structures when it travels in the network.

From the above it is clear that changing the location information in the packet does not create any problems for the IPsec processing. The packet is still correctly identified using the SPI. If, for some reason, the packet is routed to a wrong destination, the receiver is not able to open the packet as it does not have the correct key.

When an outgoing packet arrives at the HI layer from the above layer, the destination HIT is verified from the IPsec SADB. If an SA matching to the destination HIT is found, the packet is encrypted using the session key associated with the SA.

The HIT cannot be used to route the packet. Thus, the destination (and source) addresses must be changed to match the IP addresses of the nodes. These mappings are stored, as mentioned earlier, in the HI layer. After the addresses have been changed, the packet can be sent to the network where it is routed to the destination using the IP address information.

At the receiving host, the SPI value is used to find the correct SA form the IPsec SADB. If an entry is found, the IP addresses can be changed to corresponding HITs and the packet can be decrypted using the session key.

Mobility is defined to be the situation where a host moves while keeping its communication context active, or in other words the host changes its topological location, described by the IP address, while still maintaining all existing connections active. The processes running on the host do not see the mobility, except possibly if the experienced quality of service changes.

The mobile host can change the location inside one access network, between different access technologies, or even between different IP address realms, for example between the IPv4 and IPv6 networks. In HIP, the application doesn't notice the change in the IP address version. The HI layer hides the change completely from upper layers. Of course, the peer node must be able to handle the location update that changes the IP version and packets must be routable using some compatible address. If a node does not have both IPv4 and IPv6 connectivity, it may use a proxy node that performs the address version conversion and provides connectivity on behalf of the node.

Multi-homing refers to a situation where an end-point has several parallel communication paths that it can use. Usually multi-homing is a result of either the host having several network interfaces (end-host multi-homing) or due to a network between the host and the rest of the network having redundant paths (site multi-homing).

With HIP, the separation between the location and identity information makes it clear that the packet identification and routing can be cleanly separated from each other. The host receiving a packet identifies the sender by first getting the correct key and then decrypting the packet. Thus, the IP addresses that are in the packet are irrelevant.

A HIP Mobile Node (HMN), moving in the network, may change the point of attachment to the Internet constantly. When the connection point is changed, so does the IP address. This changed location information must be sent to the peer nodes, i.e. HIP Correspondent Nodes (HCN), and this is illustrated in FIG. 4 of the accompanying drawings. The same address can also be sent to a Forwarding Agent (FA) of the HMN, so that the HMN can be reached also via a more stable point. The DNS system is too slow to be used for constantly changing location information. Therefore, there must be a more stable address that can be used to contact the HMN. This address is the address provided by the FA.

The HIP Mobility and Multi-homing protocol (P. Nikander, J. Arkko, P. Jokela, "End-Host Mobility and Multihoming with Host Identity Protocol", Internet Draft, work in progress, draft-ietf-hip-mm-03, IETF, 2006) defines an update (UPDATE) packet that carries the "locator parameter"

(known as the readdress (REA) parameter in earlier Internet Drafts) which contains the current IP address of the HMN. When the HMN changes location and IP address, it generates an UPDATE packet, signs the packet with the private key matching to the used HI, and sends the packet to the peer node and to the FA.

When the peer node receives a UPDATE packet, it must start an address verification process for the IP address that is included in the UPDATE packet. The address verification is needed to avoid accepting false updates from the HMN. It sends an update acknowledgement (UPDATE-ACK) packet to the address that was in the UPDATE packet. When the HMN receives an UPDATE-ACK that matches the UPDATE sent earlier, it may start using the new IP address for sending data to HCN. After the peer node has received the first data packet from the new address, the address verification is completed and it can add the IP address as the location information of the HMN.

Because the HMN can move between networks using different IP address versions, the address received by the HCN may also be from a different address family than the previous address.

The HCN may support only one IP address version. In this case, the HCN must use some other proxy node that can be used for routing packets over to the other IP address version network.

A multi-homed HIP host, having multiple IP addresses configured on different interfaces connected to different access networks, has many more possibilities to handle the traffic towards a peer node. As it has multiple IP addresses presenting its current location in the network, it may want to tell all of these addresses to its peer nodes. To do so, the multi-homed HIP node creates a UPDATE packet that contains all the addresses that it is able to use towards that particular node. This set of addresses may contain all addresses it has, or some subset of these addresses. When the peer node receives the UPDATE packet with the multiple addresses, it must make address verification for each of these addresses to avoid possible false updates.

False, or non-routable, addresses in the UPDATE packet may be caused either because the HMN is a malicious node, it has an error in the stack implementation, or the HMN may be inside a network that uses private addresses that are not routable in the Internet.

A multi-homed HIP node is able to use all of the available connections, but efficient usage of the connections requires a policy system that has knowledge of the underlying access networks and can control the usage of them. Such a policy system can use different kinds of information: user preferences, operator preferences, input from the network connections, such as QoS, and so on.

In order to start the HIP exchange with a mobile node, the initiator node needs to know how to reach the mobile node. Although Dynamic DNS could be used for this function for infrequently moving nodes, an alternative to using DNS in this fashion is to use the piece of static infrastructure introduced above, the Forwarding Agent (also referred to as a HIP rendezvous server). Instead of registering its current dynamic address with the DNS server, the mobile node registers the address(es) of its Forwarding Agent(s). The mobile node keeps the Forwarding Agent(s) continuously updated with its current IP address(es). A Forwarding Agent simply forwards the initial HIP packet from an initiator to the mobile node at its current location. All further packets flow between the initiator and the mobile node. There is typically very little activity on a Forwarding Agent, mainly address updates and initial HIP packet forwarding. Thus, one Forwarding Agent can support a large number of potential mobile nodes. The mobile nodes must trust the Forwarding Agent to properly maintain their HIT and IP address mappings. A Forwarding Agent can be used even for nodes that are fixed in location, since it is often the case that fixed nodes can change their IP address frequently, for example when it is allocated each time an Internet connection is set up by a Service Provider for that node.

The Forwarding Agent is also needed if both of the nodes are mobile and happen to move at the same time. In that case, the HIP readdress packets will cross each other in the network and never reach the peer node. To solve this situation, the nodes should remember the Forwarding Agent address, and re-send the HIP readdress packet to the Forwarding Agent if no reply is received.

The mobile node keeps its address current on the Forwarding Agent by setting up a HIP association with the Forwarding Agent and sending HIP update packets, containing readdress, to it. A Forwarding Agent will permit two mobile systems to use HIP without any extraneous infrastructure (in addition to the Forwarding Agent itself), including DNS if they have a method other than a DNS query to get each other's HI and HIT.

In the case of legacy equipment, a host may not be HIP-enabled, and the only option is to identify connections between hosts using IP addresses. This is not secure. The situation may be improved by locating a HIP proxy between the HIP-enabled host and the host which cannot use HIP. A typical scenario would be a small corporate LAN where the client terminals are not HIP-enabled. Traffic is routed to correspondent hosts (which are HIP-enabled) via the HIP proxy.

This arrangement is illustrated in FIG. 5 of the accompanying drawings. In FIG. 5, a legacy host 12 is shown communicating with a HIP-enabled node 14 (having the domain name "hip.foo.com") via a HIP proxy 16. The legacy host 12 accesses the HIP proxy 16 over an access network 18 while the HIP proxy 16 accesses the HIP node 14 over the Internet 20. To partially secure the connection between the legacy host 12 and the HIP node 14, all communications between the HIP proxy 16 and the HIP node 14 are through a Security Association set up between the HIP proxy 16 and the HIP node 14 in a similar way to that described above with reference to FIG. 3.

However, even before the Security Association 22 shown in FIG. 5 can be set up to enable communication between the legacy host 12 and the HIP node 14, a problem arises when the legacy host 12 tries to resolve the IP address of the HIP node 14 by sending a query to a DNS server 24-1 (and in turn DNS server 24-2) when the HIP node 14 is located behind a Forwarding Agent 26 as described above. The DNS server 24-1 will return the HIT of the HIP node 14 together with the IP address of the Forwarding Agent 26. As the legacy host 12 is not HIP enabled, it will disregard the HIT and start sending messages to the Forwarding Agent 26. Without the HIT, the Forwarding Agent 26 will not be able to resolve the destination address of these messages since it is most likely that several HIP nodes will use the same Forwarding Agent 26. Likewise, since the legacy host 12 discards the HIT and uses only the IP address of the HIP node 14 when initiating a connection, the HIP proxy 16 is unable to initiate HIP negotiation between itself and the HIP node 14 because it does not know the HIT of the HIP node 14. This problem is addressed in our PCT Application No. PCT/EP04/050129.

Other technical considerations arise when implementing HIP in third generation (3G) mobile telecommunications networks where not all of the User Equipments (UEs) in the 3G environment are HIP enabled. In this context, the Universal Mobile Telecommunications System (UMTS) is the 3G successor to the Global System for Mobile Communications (GSM). The most important evolutionary step of GSM towards UMTS is the General Packet Radio Service (GPRS). GPRS introduces packet switching into the GSM core network and allows direct access to packet data networks (PDNs). This enables high-data rate packet switched transmission well beyond the 64 kbps limit of ISDN through the GSM core network, which is a necessity for UMTS data transmission rates of up to 2 Mbps. GPRS is a prerequisite for the UMTS introduction. Similar principles are equally applicable to UMTS as they are to GPRS. GPRS has been designed as an extension to the existing GSM network infrastructure, with the aim of providing a connectionless packet data service. GPRS introduces a number of new functional elements over GSM that support the end-to-end transport of IP-based packet data.

Technical difficulties have so far been hindering the usage of flow based mobility, and it is desirable to overcome at least some of these technical difficulties.

SUMMARY OF THE INVENTION

According to a first aspect of the present invention there is provided a method of using the Host Identity Protocol, HIP, to establish a connection between a second host and an application socket on a first host, comprising establishing a new or selecting an existing HIP Security Association between the first and second hosts, creating a new or selecting an existing Tube Association, identified by a Tube Identifier, between the application socket and the Security Association, forming an association for the connection between the application socket, the Security Association and the Tube Association, thereby establishing a connection between the second host and the application socket on the first host through the Security Association and Tube Association.

The application socket may comprise a port.

The application socket may comprise a HIT or LSI.

The application socket may comprise an IP address.

The method may comprise communicating information to the second host relating to the connection association.

The connection association information may be communicated in a HIP UPDATE message.

The connection association information may be communicated during HIP negotiation between the first and second hosts to establish a new Security Association.

The connection association information may comprise first information relating to the association or mapping between the Tube identifier and the socket.

The connection association information may comprise second information relating to the association between the Tube identifier and an SPI.

The first and second information may be sent as separate HIP parameters.

The HIP parameters relating to the first and second information may be TUPO_INFO and SATU_INFO parameters respectively.

The method may comprise sending the connection association information in response to a change in policies of the active connections.

The method may comprise sending the connection association information in response to a change in policies of the upper layer policy management.

The first host may be multi-homed, comprising a number of network interfaces through which a Security Association can be established towards the second host.

The second host may also be multi-homed.

An existing Tube Association may be selected in the case where an existing Security Associated is also selected.

The method may comprise creating a new Tube Association by selecting and duplicating an existing Tube Association.

The method may comprise establishing a policy for the Tube Association that is compatible with a policy established on the second host.

The method may comprise creating duplicate Tube Associations.

The duplicate Tube Associations may be respectively for incoming and outgoing traffic.

A single Security Association may be associated with the Tube Association.

A plurality of Security Associations may be associated with the Tube Association.

A plurality of Security Associations and Tube Associations may be created in advance, and the Security Association and Tube Association may be selected from these.

At least some of the information relating to the Tube Association may be managed on the first host.

According to a second aspect of the present invention there is provided an apparatus for using the Host Identity Protocol, HIP, to establish a connection between a remote host and an application socket on the apparatus, comprising means for establishing a new or selecting an existing HIP Security Association between the apparatus and the remote host, means for creating a new or selecting an existing Tube Association, identified by a Tube Identifier, between the application socket and the Security Association, means for forming an association for the connection between the application socket, the Security Association and the Tube Association, thereby establishing a connection between the remote host and the application socket on the apparatus through the Security Association and Tube Association.

According to a third aspect of the present invention there is provided an operating program which, when loaded into an apparatus, causes the apparatus to become apparatus according to the second aspect of the present invention.

According to a fourth aspect of the present invention there is provided an operating program which, when run on an apparatus, causes the apparatus to carry out a method according to the first aspect of the present invention.

The operating program may be carried on a carrier medium. The carrier medium may be a transmission medium. The carrier medium may be a storage medium.

BRIEF DESCRIPTION OF THE DRAWINGS

FIG. 9 illustrates an additional parameter used in an UPDATE message in an embodiment of the present invention;

FIG. 10 illustrates an additional parameter used in an UPDATE message in an embodiment of the present invention; and

DETAILED DESCRIPTION

As mentioned above, the mobility support in HIP is based on an UPDATE message, where the mobile host sends a location information update to the peer host. The update contains a new HIT-to-IP address mapping that the peer host uses for further communication with that host using this HIT.

An embodiment of the present invention proposes an extension to this protocol, and introduces the concept of a Tube on the end-host, with each port being mapped to a certain Tube. A particular Tube also maps to a certain ESP Security Association pair created between hosts over a particular connection path, i.e. a certain interface on both ends. (Currently, when a HIP host loses one interface and changes all connections to another interface, the old ESP SA pair is removed, and a new one is created over the new interface.)

In an embodiment of the present invention, the UPDATE packet, previously carrying the IP address information, is extended with a parameter also to carry the port numbers that are associated with a certain TubeID.

Figure 1:
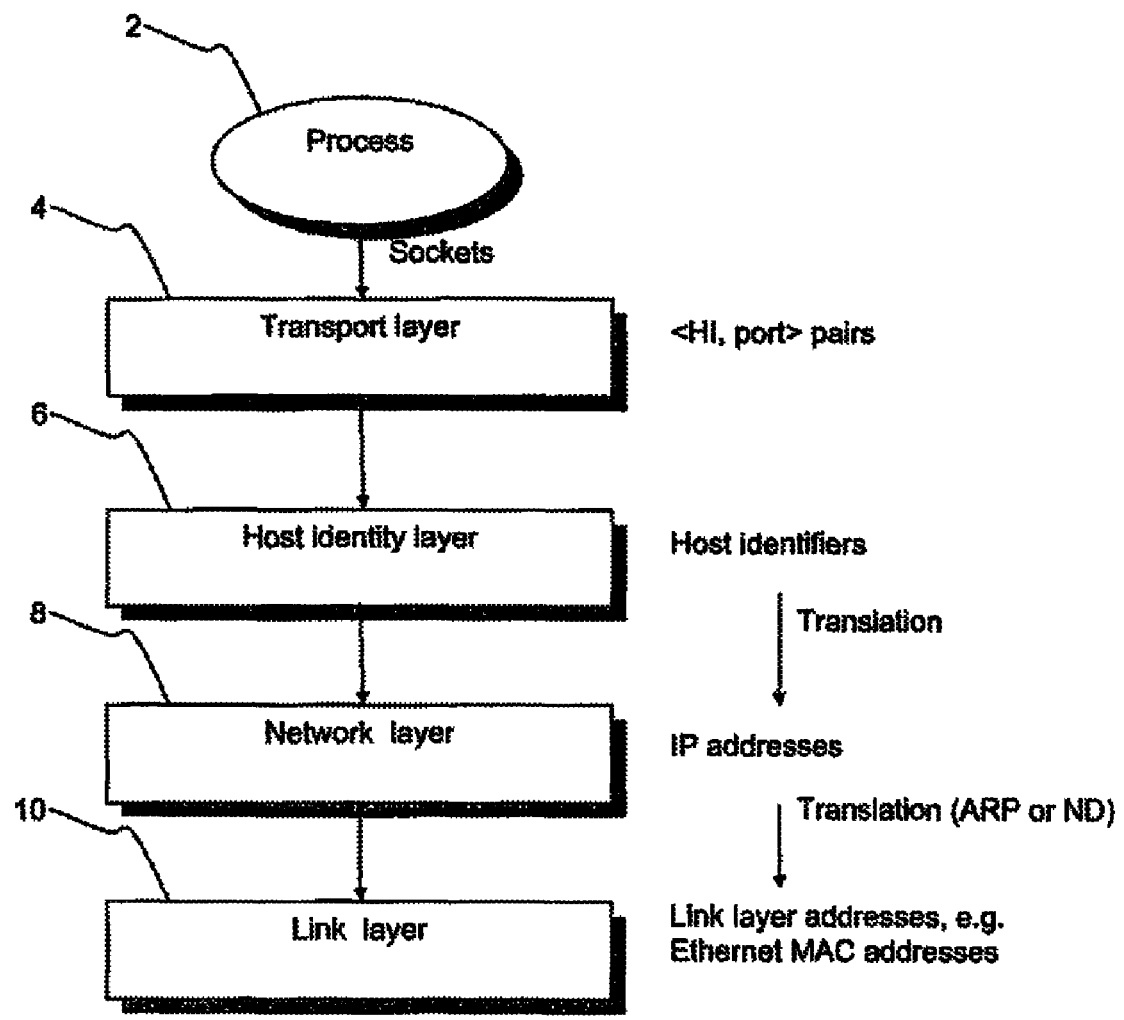
FIG. 1, discussed hereinbefore, illustrates the various layers in the Host Identity Protocol.
Figure 2:
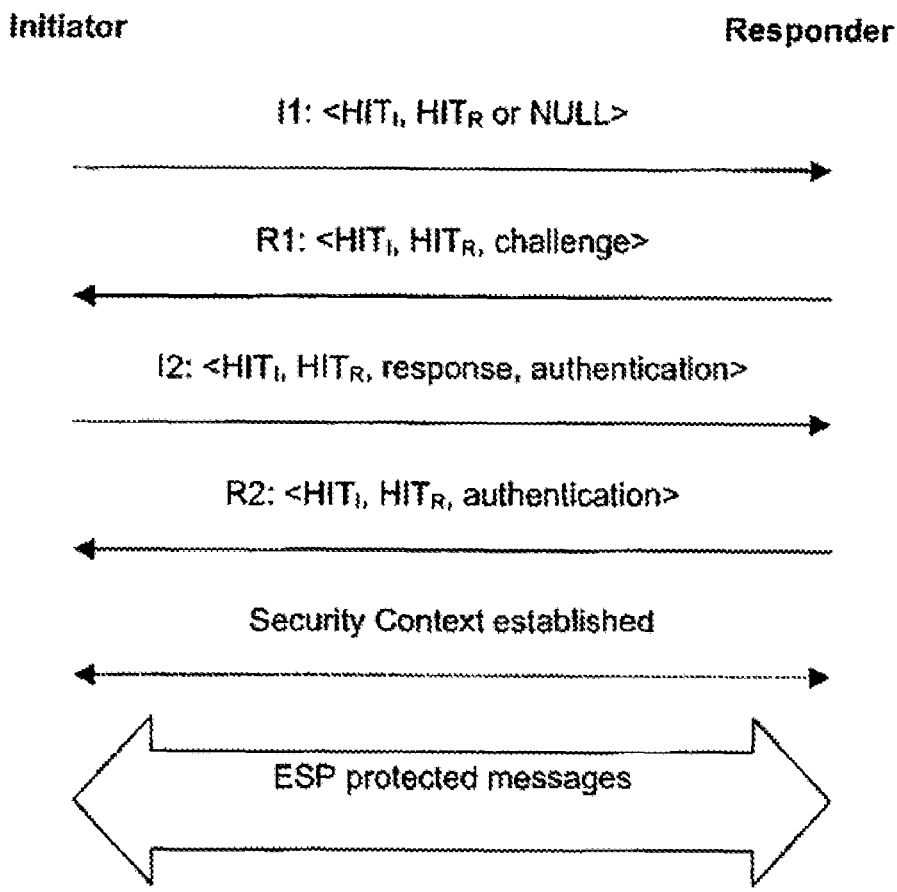
FIG. 2, also discussed hereinbefore, illustrates the operation of the four-way handshake in the HIP protocol.
Figure 3:
FIG. 3, also discussed hereinbefore, shows the logical and actual packet structures in HIP.
Figure 3:
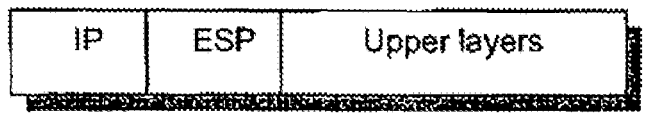
Figure 4:
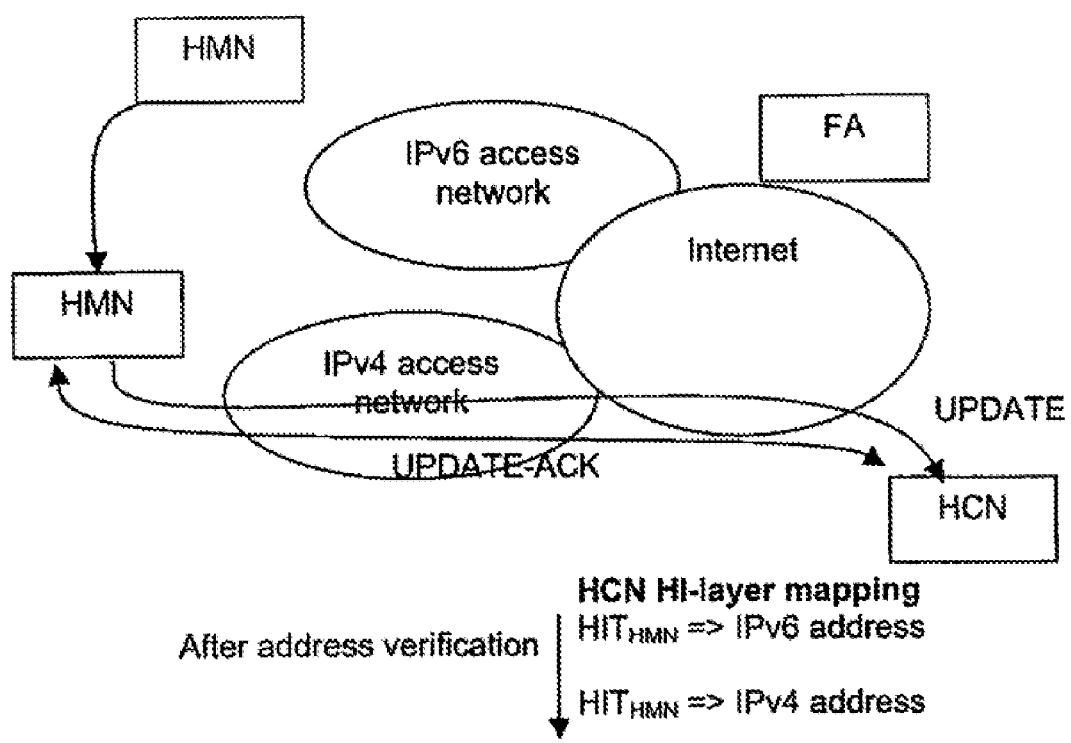
FIG. 4, also discussed hereinbefore, illustrates a handover between IPv6 and IPv4.
Figure 5:
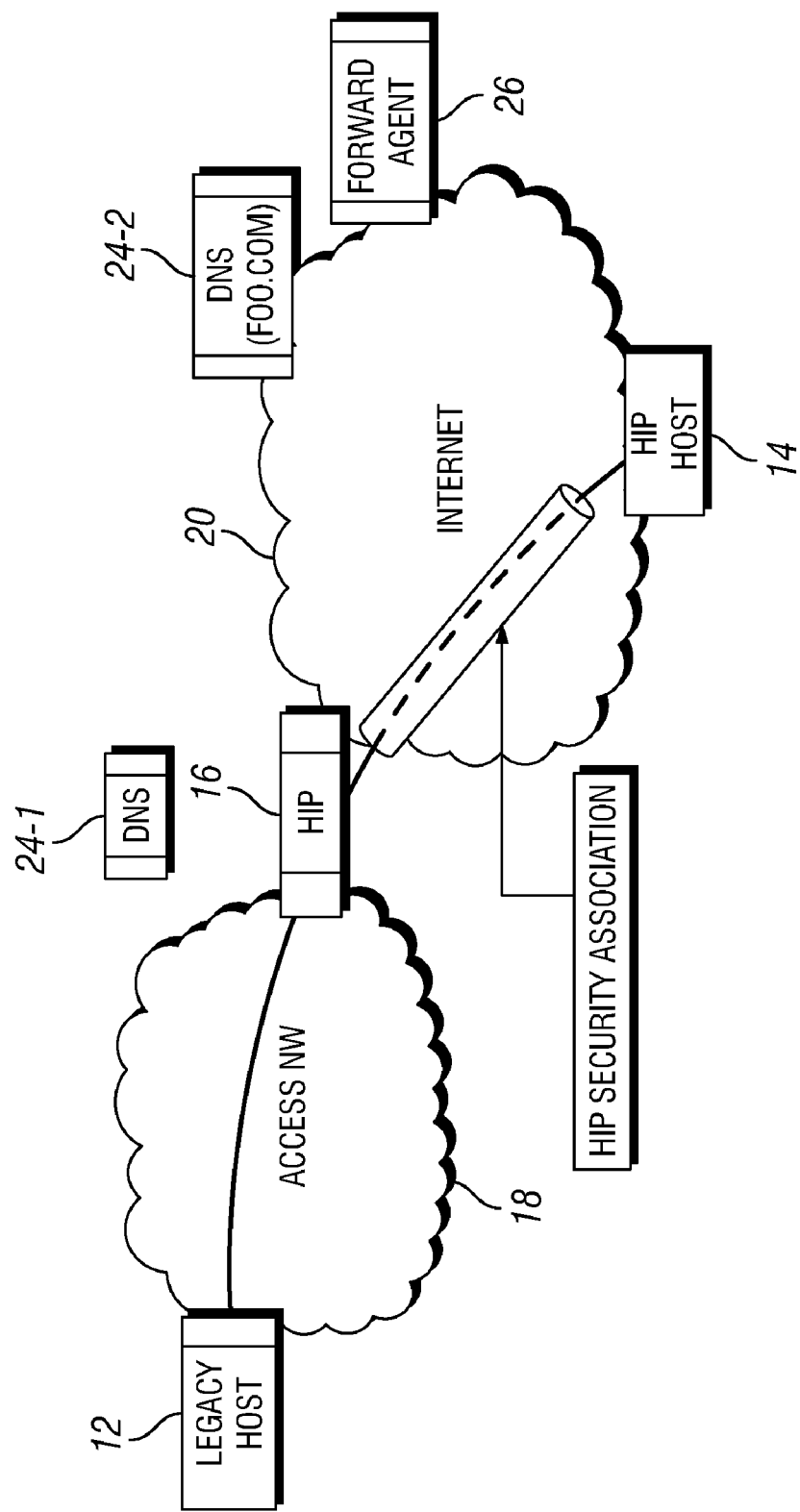
FIG. 5, also discussed hereinbefore, is a schematic diagram illustrating the general network setup for communications between a legacy host and a HIP mode via a HIP proxy.
Figure 6:
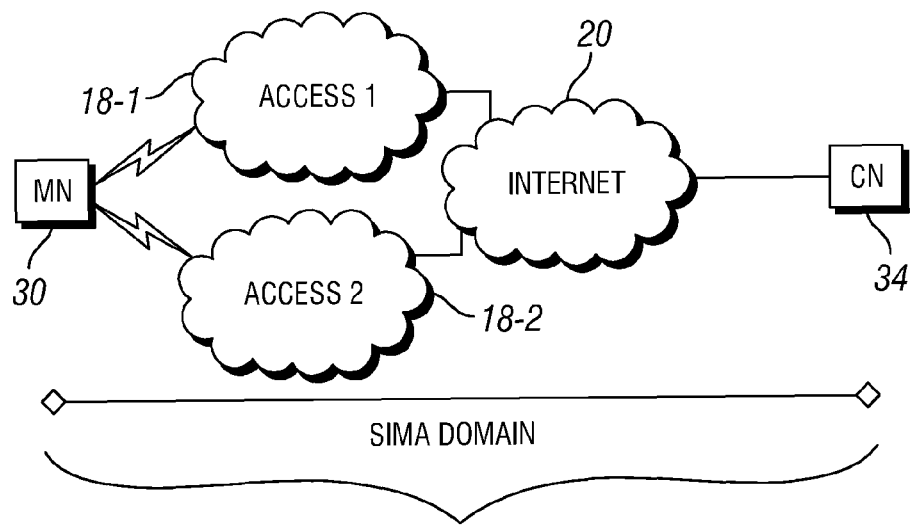
FIG. 6 illustrates one example of two host locations in a network for use in explaining an embodiment of the present invention.

FIG. 6 illustrates one example of two host locations in a network, comprising a first host 30 and a second host 32. The first host 30 is a multi-homed MN and the second host 32 is a HIP CN. The multi-homed MN 30 has two separate connections to the Internet 20 via different access networks 18-1 and 18-2, and onward to the HIP CN 32. The SIMA Domain is explained further below.

The basic HIP implementation handles the ESP SA negotiation between the nodes 30 and 32, and session key generation, to create a SA between the nodes 30 and 32. The HIP daemon (HIPD) creates the ESP SAs into the relevant IPsec databases.

Figure 7:
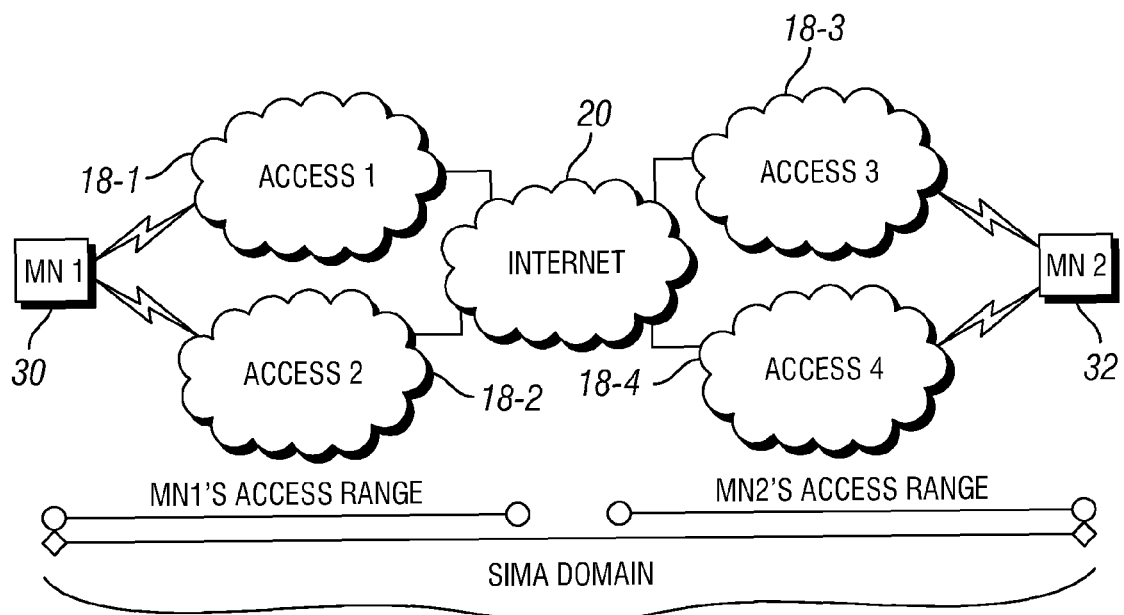
FIG. 7 illustrates another example of two host locations in a network for use in explaining an embodiment of the present invention.

FIG. 7 illustrates another example of two host locations in a network, comprising a first host 30 and a second host 32. The first host 30 is a multi-homed MN and the second host 32 is also a multi-homed MN, in contrast to FIG. 6 where the second host 32 was a HIP CN. The first multi-homed MN 30 has two separate connections to the Internet 20 via different access networks 18-1 and 18-2 (defining an access range of the first multi-homed MN 30), and the second multi-homed MN 32 also has two separate connections to the Internet 20 via different access networks 18-3 and 18-4 (defining the access range of the second multi-homed MN 32).

In the FIG. 7 scenario, the hosts 30 and 32 may define their preference on the network usage (i.e. defining TubeID and sending UPDATE messages). This more involved than the FIG. 6 scenario because connecting ports 42 to Tubes 44 (grouping, for example, three applications 40 to use same Tube 44) may not be acceptable for the other host 32, which may require that some of the applications use a different path at its end, in which case they cannot be grouped in the manner proposed by the MN 30. One solution would be to allow the hosts to "negotiate" the breaking of Tube connections and allowing one host to create two similar Tubes 44 and connect separate applications 40 to them so that it also matches the peer 32 requirements. Negotiation could be just to put port—Tube IDs 43 in one direction and responding with a new set of port—Tube IDs 43 with required duplications of Tubes 44. In a more involved solution, one Tube 44 could have multiple connections to the underlying ESP SAs 32.

As mentioned above, in an embodiment of the present invention a new abstraction level is introduced: the Tube. This will now be described in more detail with reference to FIG. 8, which corresponds to the FIG. 6 scenario in which a multi-homed MN 30 is communicating with CNs (Peer Hosts) 32, but the description herein is equally applicable to the FIG. 7 scenario.

Figure 8:
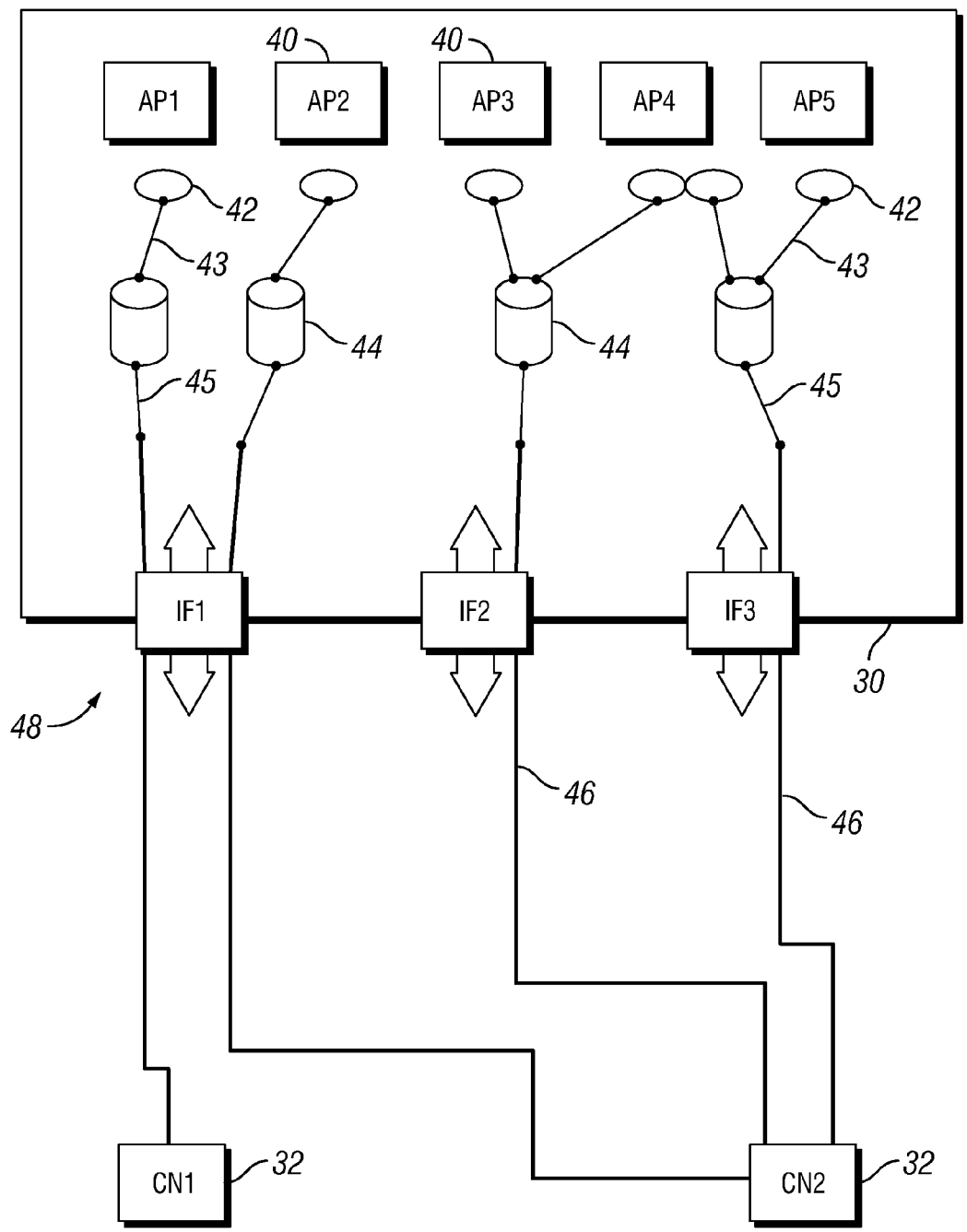
FIG. 8 illustrates schematically an embodiment of the present invention.

FIG. 8 illustrates schematically a multi-homed MN 30 in communication with CNs (Peer Hosts) 32. The MN 30 comprises a plurality of applications 40, and, since the MN 30 is multi-homed, a plurality of network interfaces 48 to the Internet (not shown) and the CNs 32. FIG. 8 also shows the associations between Ports (or Sockets) 42 associated with the applications 40, Tubes 44, and ESP SAs 46.

A Tube 44 is located between an ESP SA 46 and an application port or socket 42. The link between a port or socket 42 and a Tube 44 is dynamic, as is the link between a Tube 44 and an ESP SA 46. Each Tube 44 is assigned a TubeID.

Both end nodes 30 and 32 share the same TubeID for a given set of connections; hence the TubeID is created by the initiator and sent to the peer node. The initiator of the Tubes 44 is not necessarily the initiator of the connection in the HIP sense. The HIP Responder can also have multiple connections, in which case the HIP Responder might send the set of port-tube-SA connections 43, 45 in the R2 message, or later in the UPDATE message. Tube associations are generally host specific, or host-host specific related to one HIP association 46 between the nodes, and thus would usually be stored only at the end-hosts. A TubeID would usually be unique between a host pair. The domain of validity of the TubeID is called "SIMA domain" (SIMA, Simultaneous Multiaccess), as illustrated in FIGS. 6 and 7.

Introducing the concept of a Tube allows simpler policies to be used, since each of the ports or sockets 42 (connections) does not have to have a policy of their own.

A policy is set of rules defining the preference of network usage that is to be applied to a group of connections. The policies can have different aspects depending on the point of view from different parts of the system. It is the role of the policy engine to unify this. From the point of view of the application, an application will create a policy to be applied to a particular socket. That policy will bind the socket to a list of preference among the following:

a list of know interfaces
CN location
a network property:
technology (GPRS, WLAN . . . )
bandwith?
operator?
IP version?

When the policy is "used", for example if there have been changes in the network environment and the new setup is tested with the policy, the result is one interface that will be used for outgoing data from that point forward.

A distinction is made between permanent and ephemeral policies. An ephemeral policy is a policy that exists as long as it is applied to a group of connections. Thus it is destroyed when the last connection using that policy is closed. Typically, this is the case for a policy created by an application for a particular socket. On the other hand, a permanent policy will remain in the policy database even if no active connection is making use of it. The default policy is a set of permanent policies that are to be used if no particular policy is created for a connection. Due to the fact that permanent policies usually have a wide scope, a connection may match several policies, leading to a potential policy collision. It is therefore needed to prioritise the policies amongst each other. It may or may not be permitted to override a permanent policy.

In FIG. 8, the associations 43, 45 between the ports or sockets 42, Tubes 44 and ESP SAs 46 is shown. Each port or socket 42 is associated with one Tube 44 and each Tube 44 is associated with one ESP SA 46. Each of the Tubes 44 has a policy of its own, and the policy defines the interface to be used in different situations. Thus, on the application level, the Tube policy may be known and the application 40 can be connected to a Tube 44 with a policy suitable for the applications needs.

For a connection setup with a new host 32, for which no HIP Association 46 already exists, a new HIP association 46 is first created with the usual HIP base exchange. After the ESP SA 46 is created, a new Tube 44 is also created. The port or socket 42 that was opened for the application 40 is now connected to this new Tube 44.

It is also possible to negotiate multiple ESP SAs 46 over different interfaces 44 and create related Tubes 44 in advance.

The Port-Tube 43 and Tube-SA 45 information is communicated to the peer node in new HIP parameters, either during the base exchange or later, using UPDATE HIP messages (SATU_INFO, TUPO_INFO).

For a connection setup with a host 32 where a HIP association 46 already exists, the policy system identifies and selects the preferable Tube 44 to be used for this type of connection. The newly opened port 42 is connected to the Tube 44. The updated Port-Tube information 43 is communicated to the peer 32 using the new HIP parameter (TUPO_INFO).

In the double multi-homing case, when both hosts 30 and 32 are multi-homed, it may happen that the Port-Tube set 43 proposed by one host 30 is not suitable for the peer host 32 (for example, the peer host 32 may require different interfaces for these applications). In the first phase, can be handled so that the first host 30 creates a duplicate of the Tube 44, copies the same policies for both Tubes 44, and makes the compatibility with the peer host 32 with this method. It is also possible that a Tube 44 could be connected to multiple ESP SAs 46 simultaneously (called a Multi-Tube or MuTu); this would require a packet mapping policy to deal with how the correct destination IP address is determined.

Asymmetric links (sending and receiving via different interfaces) can also be handled similarly using duplicate Tubes 44. The difference is that the local port 42 is connected to two Tubes 44; one for outgoing traffic and one for incoming traffic. For the peer 32, only the incoming Tube-Port pair 43 need be communicated (where the peer 32 sends data), the other pair 45 is not needed by the peer 32. Packets to the peer 32 may appear to come from a different source address, but in HIP this does not matter, because the packet identification is based on the HIT.

More information relating to the new HIP parameter will now be discussed.

The HIP UPDATE packet is defined to transfer the changed IP address information to the peer node 32 so that the host can make a new HIT-to-IP address mapping for the mobile host 30. The present embodiment uses two, quite similar, additional parameters for the UPDATE message. First, a parameter is used that connects local port numbers to a certain TubeID, and second, a parameter is used that connects TubeIDs to a certain SPI.

There are at least two possible ways to include the Tube information in the new parameter.

Firstly, the parameter could contain only the "effective" policy information from the multi-homed host 30. This means that the information does not contain multiple choices for one connection identifier, but only the active one. This information can be directly configured into the IPsec policy management. This is perhaps simpler to implement, but a potential drawback is that the policy information must be sent in the parameter each time there is a change in policies of the active connections.

Secondly, the parameter could contain the basic set of policies, including multiple choices as destination interfaces for each of the connection identifiers. With this solution, the policy information need be transmitted only when there are changes in the actual policies in the upper layer policy management. A potential drawback is that the CN 32 must somehow get the knowledge about the lost interface, i.e. using the received ICMP packet. And in addition, the multi-homed host 30 may have to still send the updated information to the peer node 32, otherwise the wrong Tube-ESP SA binding 45 information may still at the peer 32 (in case the lost connection never shows up again).

In this embodiment, a TUPO_INFO parameter is used to transmit the Port-Tube mappings 43 to the peer host 32. Each of the ports 42 can be connected to one Tube 44 and one Tube 44 can have connection to multiple ports 42. To support fine-grained separation of connections, both port numbers and protocol number would be included in the parameter. An example TUPO_INFO parameter is illustrated in FIG. 9.

In this embodiment, a SATU_INFO parameter is used to transmit ESP Security Association and Tube associations 45. Each of the Tubes 44 can, in one example, be connected to one ESP SA 46, identified by the SPI value. One ESP SA 46 can have multiple Tubes 44 connected to it. An example SATU_INFO parameter is illustrated in FIG. 10.

A multi-homing system embodying the present invention takes advantage of the base HIP system with UPDATE message and connects the multiple interface usage to the Identity/Locator split architecture. An embodiment of the present invention provides flow based mobility management in an elegant and relatively simple way using the Host Identity Protocol. By adding information to the HIP UPDATE messages about ports, protocols, and (a new abstraction) Tubes, sets of information can be created that can be used for proper flow-based routing of data.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

A person skilled in the art will appreciate that embodiments of the present invention are not necessarily limited to any particular protocol or addressing scheme for each of the layers, for example in the transport or network layers, and will function within the HIP framework whatever addressing or transport protocol is used around that framework.

What is claimed is:

1. A method of utilizing the Host Identity Protocol (HIP) to establish a connection between a second host and an application socket on a first host, said method comprising the steps of:

establishing a new or selecting an existing HIP Security Association between the first and second hosts;

creating a new or selecting an existing Tube between the application socket and the Security Association; and forming an association for the connection between the application socket, the Security Association, and the Tube, thereby establishing a connection between the second host and the application socket on the first host through the Security Association and Tube.

2. The method as claimed in claim 1, wherein the application socket comprises a port.

3. The method as claimed in claim 1, wherein the application socket comprises a Host Identity Tap (HIT) or local Scope Identifier (LSI).

4. The method as claimed in claim 1, wherein the application socket comprises an IP address.

5. The method as claimed in claim 1, further comprising communicating information to the second host relating to the connection association.

6. The method as claimed in claim 5, wherein the connection association information is communicated in a HIP UPDATE message.

7. The method as claimed in claim 5, wherein the connection association information is communicated during HIP negotiation between the first and second hosts to establish a new Security Association.

8. The method as claimed in claim 5, wherein the Tube is identified by a Tube Identifier, and the connection association information comprises first information relating to the association or mapping between the Tube identifier and the socket.

9. The method as claimed in claim 8, wherein the connection association information comprises second information relating to the association between the Tube identifier and a Security Parameter Index (SPI).

10. The method as claimed in claim 9, wherein the first and second information are sent as separate HIP parameters.

11. The method as claimed in claim 10, wherein the HIP parameters relating to the first and second information are TUPO INFO and SATU INFO parameters, respectively.

12. The method as claimed in claim 5, wherein the step of communicating the connection association information includes sending the connection association information in response to a change in policies of active connections.

13. The method as claimed in claim 5, wherein the step of communicating the connection association information includes sending the connection association information in response to a change in policies of upper layer policy management.

14. The method as claimed in claim 1, wherein at least one of the first host and the second host is multi-homed, and the step of establishing the Security Association includes establishing the Security Association toward the second host through a number of network interfaces.

15. The method as claimed in claim 1, wherein an existing Tube is selected if an existing Security Associated is also selected.

16. The method as claimed in claim 1, wherein the step of creating a new or selecting an existing Tube includes creating a new Tube by selecting and duplicating an existing Tube.

17. The method as claimed in claim 1, further comprising establishing a policy for the Tube that is compatible with a policy established on the second host.

18. The method as claimed in claim 1, further comprising creating duplicate Tubes.

19. The method as claimed in claim 18, wherein the duplicate Tubes are respectively for incoming and outgoing traffic.

20. The method as claimed in claim 1, wherein a plurality of Security Associations are associated with the Tube.

21. The method as claimed in claim 1, wherein a plurality of Security Associations and Tubes are created in advance, and the Security Association and Tube are selected from these.

22. The method as claimed in claim 1, wherein at least some of the information relating to the Tube is managed on the first host.

23. The method of claim 1, wherein the method is performed by an apparatus controlled by an operating program loaded into the apparatus.

24. The method of claim 1, wherein the HIP Security Association is an Encapsulating Security Payload (ESP) Security Association.

25. An apparatus for utilizing the Host Identity Protocol (HIP) to establish a connection between a remote host and an application socket on the apparatus, the apparatus comprising:

means for establishing a new or selecting an existing HIP Security Association between the apparatus and the remote host;

means for creating a new or selecting an existing Tube between the application socket and the Security Association; and means for forming an association for the connection between the application socket, the Security Association, and the Tube, thereby establishing a connection between the remote host and the application socket on the apparatus through the Security Association and Tube.

26. The apparatus of claim 25, wherein the establishing means, creating means, and forming means are an operating program loaded into the apparatus.

27. The apparatus of claim 26, wherein the operating program is stored on a computer-readable medium.

28. The apparatus of claim 25, wherein the HIP Security Association is an Encapsulating Security Payload (ESP) Security Association.

* * * * *

UNITED STATES PATENT AND TRADEMARK OFFICE
CERTIFICATE OF CORRECTION

| | | |
|---|---|---|
| PATENT NO. | : 7,849,195 B2 | Page 1 of 1 |
| APPLICATION NO. | : 11/915196 | |
| DATED | : December 7, 2010 | |
| INVENTOR(S) | : Jokela et al. | |

It is certified that error appears in the above-identified patent and that said Letters Patent is hereby corrected as shown below:

In Column 9, Lines 4-5, delete "invention;" and insert -- invention; and --, therefor.

In Column 9, Lines 7-8, delete "invention; and" and insert -- invention. --, therefor.

In Column 10, Line 50, delete "bandwith?" and insert -- bandwidth? --, therefor.

In Column 13, Line 9, in Claim 3, delete "Tap" and insert -- Tag --, therefor.

In Column 13, Line 9, in Claim 3, delete "local" and insert -- Local --, therefor.

In Column 13, Line 36, in Claim 11, delete "TUPO INFO and SATU INFO" and insert -- TUPO_INFO and SATU_INFO --, therefor.

Signed and Sealed this
Twelfth Day of April, 2011

David J. Kappos
*Director of the United States Patent and Trademark Office*